United States Patent
Tiihonen

(10) Patent No.: US 9,284,626 B2
(45) Date of Patent: Mar. 15, 2016

(54) METHOD FOR PURIFYING LITHIUM BICARBONATE

(75) Inventor: Marika Tiihonen, Jyväskylä (FI)

(73) Assignee: Outotec Oyj, Espoo (FI)

( * ) Notice: Subject to any disclaimer, the term of this patent is extended or adjusted under 35 U.S.C. 154(b) by 651 days.

(21) Appl. No.: 13/255,099

(22) PCT Filed: Mar. 1, 2010

(86) PCT No.: PCT/FI2010/050158
§ 371 (c)(1),
(2), (4) Date: Sep. 6, 2011

(87) PCT Pub. No.: WO2010/103173
PCT Pub. Date: Sep. 16, 2010

(65) Prior Publication Data
US 2011/0318253 A1    Dec. 29, 2011

(30) Foreign Application Priority Data
Mar. 11, 2009   (FI) ...................................... 20090090

(51) Int. Cl.
| | | |
|---|---|---|
| C01D 15/08 | (2006.01) | |
| C22B 26/12 | (2006.01) | |
| B01J 39/04 | (2006.01) | |
| B01J 49/00 | (2006.01) | |
| C22B 3/20 | (2006.01) | |
| C22B 3/42 | (2006.01) | |

(52) U.S. Cl.
CPC ................. C22B 26/12 (2013.01); B01J 39/04 (2013.01); B01J 39/046 (2013.01); B01J 49/0069 (2013.01); B01J 49/0078 (2013.01); C22B 3/20 (2013.01); C22B 3/42 (2013.01); Y02P 10/234 (2015.11)

(58) Field of Classification Search
CPC ...... B01J 39/04; B01J 39/046; B01J 49/0069; B01J 49/0078; C22B 3/20; C22B 3/42; C22B 26/12; Y02P 10/234
USPC .......................... 210/670, 673, 677, 681, 687; 423/179.5, 181, 422
See application file for complete search history.

(56) References Cited

U.S. PATENT DOCUMENTS

| | | | |
|---|---|---|---|
| 5,419,819 A | | 5/1995 | Park |
| 5,451,383 A | * | 9/1995 | Leavitt ........................ 423/179.5 |
| 5,919,287 A | * | 7/1999 | Moreau ........................... 95/130 |
| 6,048,507 A | * | 4/2000 | Amouzegar et al. ........ 423/179.5 |
| 6,120,927 A | | 9/2000 | Hayashi et al. |
| 6,514,414 B1 | * | 2/2003 | Martin ........................... 210/670 |
| 6,592,832 B1 | | 7/2003 | Friedrich |

FOREIGN PATENT DOCUMENTS

| | | |
|---|---|---|
| CN | 1172462 A | 2/1998 |
| CN | 1265376 A | 9/2000 |
| CN | 1686805 A | 10/2005 |
| CN | 101177288 B | 5/2008 |
| WO | 9929624 A1 | 6/1999 |

OTHER PUBLICATIONS

Duolite C467 Industrial Grade Chelating Resin Product Data Sheet [online], Nov. 2000 [retrieved on Oct. 17, 2013], Rohm and Haas Company. Retrieved from the Internet: <URL: http:/www.inaqua.de/Prod/ion/RH_e/Duolite%20C467.pdf>.*
Office action (with English translation) for Chinese application No. 201080011083.4 issued Jan. 31, 2013 by State Intellectual Property Office of the People's Republic of China, 15 pages.
Ion exchange resins for metal plating and surface finishing. Datasheet [online]. Rohm and Haas, 1999. Retrieved from the Internet: <URL: http://www.rohmhaas-polska.com/stuff/metal.pdf> p. 13.
Chinese Office action for Chinese Application No. 201080011083.4 issued Aug. 12, 2013, 14 pages.

* cited by examiner

*Primary Examiner* — Matthew O Savage
(74) *Attorney, Agent, or Firm* — Chernoff, Vilhauer, McClung & Stenzel, LLP

(57) ABSTRACT

The invention relates to a method for purifying impure lithium bicarbonate by means of a cation exchange resin. In addition to solution purification by ion exchange, the treatment stages include the regeneration of impurity metals bound to the resin. Regeneration consists of washing the resin with water, elution with acid solution, washing with water, neutralization with alkali solution and washing with water. It is characteristic of the method that neutralization is performed with sodium hydroxide solution.

6 Claims, No Drawings

METHOD FOR PURIFYING LITHIUM BICARBONATE

This is a national stage application filed under 35 USC 371 based on International Application No. PCT/FI2010/050158 filed Mar. 1, 2010, and claims priority under 35 USC 119 of Finnish Patent Application No. 20090090 filed Mar. 11, 2009.

FIELD OF THE INVENTION

The invention relates to a method for purifying a lithium bicarbonate solution using ion exchange. The purification of lithium bicarbonate solution forms a sub-process in the fabrication of pure lithium chemicals.

BACKGROUND OF THE INVENTION

Minerals containing lithium are mostly spodumene, petalite and lepidolite. There may also be lithium in the hypolimnion of brine lakes, but the ratio of lithium to magnesium in it is decisive for industrial production. Likewise there is also lithium in seawater. The greatest users of lithium at present are the glass and ceramics industry, and the accumulator and battery industry. The share of the latter is growing constantly, since lithium accumulators play a significant role for instance in the development of the electric cars. Some of the lithium is used as lithium carbonate or is at least a commercial intermediate product.

In lithium recovery, lithium mineral is concentrated, after which concentrate processing usually comprises a change in the crystal structure at high temperature, pressure leaching, carbon dioxide treatment and the filtration and purification of the lithium bicarbonate $LiHCO_3$ that is generated. Purification can take place either on the liquid-liquid extraction principle or by ion exchange. U.S. Pat. No. 6,048,507 describes a method in which the purification of lithium bicarbonate takes place by carbon dioxide treatment and ion exchange. The purpose of ion exchange is to remove divalent metal ions, such as calcium, magnesium, iron and aluminium ions, from a lithium-containing solution. After this, the pure lithium bicarbonate is crystallised, so that pure lithium carbonate $Li_2CO_3$ is generated.

Ion exchange is done typically with selective cation exchange resins, in which the ion exchange group is for example iminodiacetic acid (IDA) or aminophosphonic acid (APA). The resins concerned are manufactured for example by Rohm & Haas under the trade name Amberlite IRC 748 (IDA) and Amberlite IRC 747 (APA). The resins are selective for multivalent metal ions and are used for the removal of calcium and magnesium etc. from concentrated NaCl-salt solution in the chlor-alkali industry. The ion exchange groups of the resin are weak organic acids. The resins are especially selective for heavy metal ions ($Cu^{2+}$, $Pb^{2+}$, $Ni^{2+}$). In the column process, the solution to be purified is run through the column and the purified solution is collected from the solution exiting the column. When the resin is no longer able to produce pure solution, the metals bound to the resin are eluted with an acid solution, and the resin is converted to the acid form. An excess of acid has to be used in relation to the ion exchange groups. In acid form, the ion exchange group is undissociated in aqueous solution and is unable to bind metal ions; instead it has to be neutralised before the following purification cycle.

Selective cation exchange resins are generally used in metals recovery for instance from wastewaters and pickling solutions and the metals to be recovered are usually the above-mentioned heavy metals such as copper, nickel and lead. In this case the regeneration of resins generally takes place in accordance with the following sequence;

| | |
|---|---|
| Washing | water |
| Elution | acid solution (e.g. HCl, $H_2SO_4$, 1-2 mol/l) |
| Washing | water |
| Neutralisation | alkali solution (e.g. NaOH, 1 mol/l) |
| Washing | water |

The washes with water displace the previous solution from the resin column between the acid and alkali stages.

US patent publication 6,048,507 describes the purification of lithium bicarbonate solution by ion exchange, in which metallic impurities, particularly divalent ones, are bound to the resin used. When the resin is saturated for example with regard to calcium, it is regenerated. Regeneration consists of firstly washing with water and subsequently treatment with hydrochloric acid to remove the calcium ions from the resin. When the calcium ions and other metal ions have been removed from the resin, it is washed again with water. Lithium hydroxide solution is used for regeneration with an alkali before the following purification cycle. Both the lithium hydroxide solution and the hydrochloric acid solution used can be utilised according to the text of the patent a number of times before they need to be replaced.

PURPOSE OF THE INVENTION

In methods accordant with the prior art, a considerable amount of lithium is lost to the regeneration chemicals. In addition, lithium hydroxide and hydrochloric acid are expensive reagents. In particular the majority (estimated over 95%) of the lithium hydroxide used in the regeneration of ion exchange resin is transferred to the impure hydrochloric acid solution. As stated above, hydrochloric acid solution can be recycled in elution and the acid can also be regenerated by means of electrodialysis. However, regeneration methods and equipment materials in hydrochloric acid applications are generally expensive. The purpose of the invention now developed is to achieve a more cost-effective method than earlier for purifying lithium bicarbonate.

SUMMARY OF THE INVENTION

The essential features of the invention will be made apparent in the attached claims.

The invention relates to a method for purifying impure lithium bicarbonate by means of cation exchange resin in a column. In addition to solution purify-cation by ion exchange, the treatment stages include the regeneration of impurity metals bound to the resin. Regeneration consists of washing the resin with water, elution with acid solution, washing with water, neutralisation with alkali solution and washing with water. It is characteristic of the method that neutralisation is performed with sodium hydroxide solution.

According to one embodiment of the method, elution is carried out with sulphuric acid solution.

According to another embodiment of the method, elution is carried out with hydrochloric acid solution.

In an embodiment of the method the concentration of the sodium hydroxide solution used for neutralisation is 0.5-2 mol/l.

In an embodiment of the method the concentration of the acid solution used for elution is 0.5-2 mol/l.

According to one typical embodiment of the method, the first solution fraction in the solution purification stage carried out after neutralisation with sodium hydroxide is first taken separately and is routed back into the column at the end of the stage before regeneration wherein the sodium of the solution to be fed displaces at least partly the lithium bound to the resin. The volume of the first fraction is preferably about two resin beds in size.

DETAILED DESCRIPTION OF THE DRAWINGS

The purification of lithium bicarbonate solution is performed by ion exchange as a column process. The method has particularly exploited the selectivity sequence of the resins: $Li^+<Na^+<<$multivalent metal ions$<H^+$. In the method accordant with the invention, sodium hydroxide is used as the alkali in resin neutralisation instead of lithium hydroxide solution i.e. the resin is initially in sodium form. Metallic impurities (e.g. Fe, Ca, Mg, Al) from the $LiHCO_3$ solution bind themselves to the resin. Right at the start of the ion exchange cycle, the sodium-form resin and the concentrated lithium solution seek equilibrium, whereby a drop in Li content and an increase in Na content occur in the product solution.

The first $NaHCO_3$-containing fraction is taken separately from the solution exiting the column. This fraction is about the volume of two resin beds in size. After this, the product solution is obtained from the column, in which the lithium and sodium content remain during ion exchange at almost the feed level. After the feed of the process solution, before the actual regeneration, the $NaHCO_3$-rich fraction collected at the beginning is run back into the column. In this way the sodium displaces the majority of the lithium bound to the resin, and there is a high lithium content in the solution exiting the column. This solution can be joined to a process, most easily to the ion exchange feed. In the method accordant with the invention, the lithium losses of ion exchange are reduced considerably in comparison with the method described in the prior art, in which the resin is neutralised to the lithium form. After the actual ion exchange stage, the resin goes for regeneration, in which the first step is the elution of metals with acid solution.

The advantage of the method now developed is that when the resin is exhausted or filled with impurity metals, the majority of it is still in the original, neutralised form, i.e. in the sodium form in accordance with this invention. The resin can never become full of impurities. When resin enters the elution stage, all the metals bonded to it, including Li/Na, are released and end up in the acid, and their separation from the acid demands a relatively expensive separation method. The fraction that is in the acid is therefore either waste or difficult to utilise, i.e. in order to recover sodium or lithium, for instance electrodialysis is required. In accordance with the method now developed, the resin entering elution therefore contains only sodium in addition to the impurities to be removed, not lithium. When acid has to be discharged as waste, only relatively inexpensive sodium is removed with it from the process, and not valuable lithium.

The elution of metals from the resin is done with acid solution, whereby in accordance with the method, it is advantageous to use sulphuric acid solution with a concentration of around 0.5-2 mol/l, preferably 1 mol/l, instead of hydrochloric acid. In the method accordant with the prior art, elution is carried out with hydrochloric acid seemingly because it prevents the precipitation of calcium as gypsum. However, in the tests we carried out, it was found that the impurity metals are distributed evenly in the resin mass, so that the precipitation of calcium in the resin as gypsum was not observed, at least not if the amount of calcium was less than 10 mg/L. All the calcium was found to have been removed from the resin in elution. It is possible to neutralise the sulphuric acid used advantageously by means of limestone, whereby the other impurity metals are also precipitated into the gypsum sediment. Using sulphuric acid as the acid is simpler than using hydrochloric acid, since the equipment used does not need to be of special material as in the use of hydrochloric acid. After elution, the resin is washed with water and neutralised with a sodium hydroxide solution of 0.5-2 mol/l, preferably 1 mol/l, to sodium form before the following purification cycle.

If the solution to be purified contains a large amount of calcium, it is also possible to use hydrochloric acid solution for elution.

Lithium carbonate is produced from the purified solution by crystallisation, in other words by heating the solution to a temperature of 70-90° C., whereupon carbon dioxide is released and the lithium carbonate product crystallises. The precipitate is filtered and dried. In order to lower the sodium content of the product and to remove the other water-soluble impurities the precipitate is washed with hot water and filtered again.

The method for purifying lithium bicarbonate solution described above can be utilised as part of lithium carbonate production from raw materials of mineral origin such as spodumene. It is also applicable for the purification process of impure lithium carbonate. Extremely pure lithium carbonate >99.9% can be manufactured with the method, and it can be further purified and converted into other pure lithium chemicals (e.g. LiCl, LiF).

In the tests performed, it was found that when manufacturing lithium carbonate from spodumene concentrate in the manner accordant with the invention, the impurities of the product were e.g. at the level of: Pb<1 ppm, Mg and Fe<5 ppm, S<10 ppm and Ca<20 ppm as well as Al 12 ppm and Na 57 ppm. Lithium carbonate, which has a content of >99.9% is a commercial or battery-grade product.

The invention claimed is:

1. A method for purifying an impure aqueous solution of lithium bicarbonate containing divalent metal cations the method comprising the steps of:
   a) providing a bed of an organic weak acid cation exchange resin that is substantially free of multivalent cations and has been neutralized with sodium ions, wherein the resin has a selectivity for cations in the sequence of $Li^+<Na^+$ <multivalent metal cations<$H^+$;
   b) passing the impure aqueous solution of lithium bicarbonate through the bed provided by step a) to remove the divalent metal cations from the impure aqueous solution;
   c) collecting a solution containing sodium ions from the bed at a beginning of step b);
   d) collecting a purified aqueous solution of lithium bicarbonate from the bed during step b) and following step c);
   e) passing the solution collected in step c) through the bed to displace lithium ions from the bed to produce a solution containing lithium ions following step d);
   f) collecting the solution containing lithium ions during step e);
   g) passing water through the bed following step e) to rinse the bed;
   h) passing an aqueous solution containing an acid through the bed following step g) to elute the divalent metal cations from the cation exchange resin;
   i) passing water through the bed following step h) to rinse the bed;

j) passing an aqueous solution containing sodium hydroxide through the bed following step i) to neutralize the cation exchange resin thereby providing the bed recited in step a).

2. A method according to claim 1, wherein the acid recited in step h) is sulfuric acid.

3. A method according to claim 1, wherein the acid recited in step h) is hydrochloric acid.

4. A method according to claim 1, wherein a concentration of sodium hydroxide in the aqueous solution recited in step j) is 0.5-2 mol/l.

5. A method according to claim 1, wherein a concentration of the acid in the aqueous solution recited in step h) is 0.5-2 mol/l.

6. A method according to claim 1, wherein the bed of cation exchange resin has a volume, and wherein a volume of the solution collected in step c) is equal to about two times the volume of the bed in size.

* * * * *